April 28, 1970     E. A. MEYER     3,508,371

STRUCTURAL ASSEMBLY AND CLIP

Filed Nov. 8, 1967     2 Sheets-Sheet 1

INVENTOR
ENGELBERT A. MEYER
BY
*Burton & Parker*
ATTORNEYS

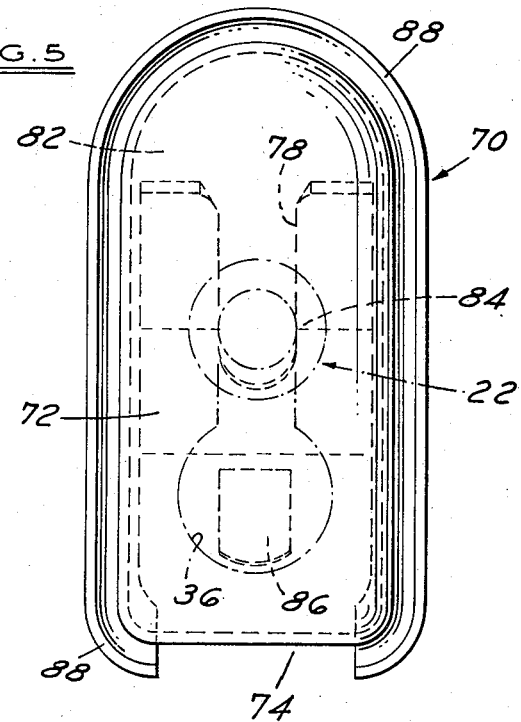
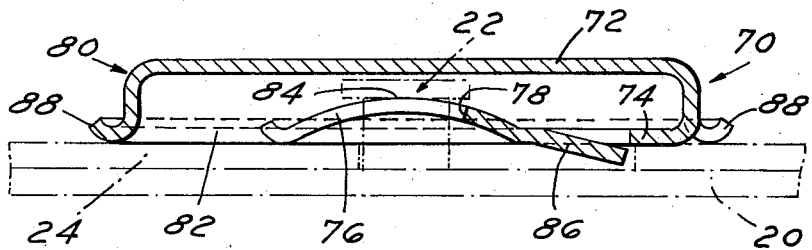

United States Patent Office 3,508,371
Patented Apr. 28, 1970

---

3,508,371
STRUCTURAL ASSEMBLY AND CLIP
Engelbert A. Meyer, Union Lake, Mich., assignor to Warren Fastener Corporation, Mount Clemens, Mich., a corporation of Michigan
Filed Nov. 8, 1967, Ser. No. 681,520
Int. Cl. F16b *21/06, 21/09*
U.S. Cl. 52—717                         15 Claims

ABSTRACT OF THE DISCLOSURE

This disclosure relates to a structural assembly including a support having a stud secured thereto, a structural member overlying the support having a keyhole slot receiving the stud adjacent the end of the slot, and a sheet metal clip overlying the structural member, tensioning the structural member against the support. The clip receives the stud in a slot which overlies the slot of the structural member, in opposed relation thereto, and a detent of the clip extends within the opening of the structural member to restrict withdrawal of the clip. One embodiment of the clip means disclosed herein includes a cover portion having an end reversely folded therebeneath to define an inclined ramp portion which receives the stud. The other embodiment has a cup-shaped portion which receives the button therebeneath, and an opposed inclined ramp portion which receives the stud. Each of the embodiments disclosed includes an upturned peripheral edge.

FIELD OF THE INVENTION

This invention relates to structural assemblies, including panel assemblies, having a stud and a clip secured to the stud. The assembly may also include a panel having a plurality of studs supporting a second panel, and an equal number of clips. The assembly of my invention may be utilized by the automotive, appliance, and building industries to support various structural members, including cover panels for automobiles, trucks, and appliances, or accessories for the automotive industry.

DESCRIPTION OF THE PRIOR ART

The clips shown by the prior art are generally not intended to secure relatively heavy structural members, as such are generally supported by threaded fasteners. The clip and structural assembly of my invention is intended to extend the application of the weld-on fasteners, disclosed in United States Patent 3,153,468 to permit utilization of the relatively small headed button in "heavy duty" applications. Examples of clips or adaptors shown by the prior art include my United States Letters Patent 3,239,-988, and the following United States patents: 2,172,302, 2,358,837, 2,709,390, 3,216,166.

SUMMARY OF THE INVENTION

The structural assembly of my invention includes a support having a stud secured thereto and extending from the surface thereof a structural member having an enlarged opening adapted to receive the stud, and a slot communicating with the opening which receives the stud therethrough adjacent the end of the slot, and a clip secured to the stud tensioning the structural member against the support. The clip receives the stud in a slot which overlies the slot in the structural member, in opposed relation thereto. The opposed slots prevent motion of either member in one direction, and the clip is provided with a detent which extends into the enlarged opening of the structural member to prevent withdrawal of the clip or motion of the assembly in the opposite direction. In the preferred embodiment of the assembly of my invention, the detent is struck from the clip at an acute angle, away from the stud seat defined at the end of the slot. An inclined ramp portion tensions the clip against the structural member. The clip may be reinforced by an upwardly extending peripheral flange, which also defines an upwardly facing channel adjacent the periphery of the clip. The upwardly turned periphery of the clip also prevents marring of the structural member during assembly and disassembly, and the channel will retain sealant for the assembly as described hereinafter.

Two embodiments of the clip of my invention are disclosed herein. In the first embodiment, the clip includes a downwardly facing cup-shaped portion, adapted to receive the stud therebeneath, terminating an enlarged opening adapted to receive the head portion of the stud therethrough. An inclined ramp portion is provided opposite the enlarged opening, having a slot communicating with the enlarged opening. A headed stud is received beneath the cup-shaped portion and the clip is shifted to seat the stud in th slot, which tensions the clip against the structural member. In the other embodiment of the clip means disclosed herein, the clip means includes an elongated upper cover portion having one end reversely folded therebeneath to define a clip portion. The clip portion is generally parallel to the top of the cover portion, and has an inclined ramp portion. The stud is received in a slot defined in the inclined ramp portion, which tensions the peripheral edge of the cover against the supporting structure.

BRIEF DESCRIPTION OF THE DRAWINGS

FIGURE 5 is a top view of another embodiment of the clip means of my invention; and FIGURE 6 is a side cross sectional view of the clip means shown in FIGURE 5.

DESCRIPTION OF THE PREFERRED EMBODIMENTS

Figure 3:
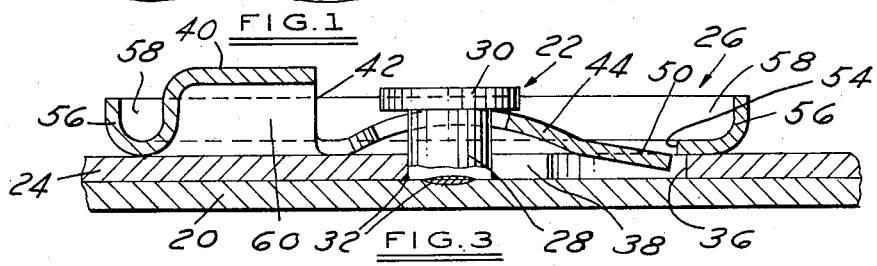
FIGURE 3 is a side cross sectional view of the structural assembly of my invention utilizing the clip shown in FIGURE 2.
Figure 4:
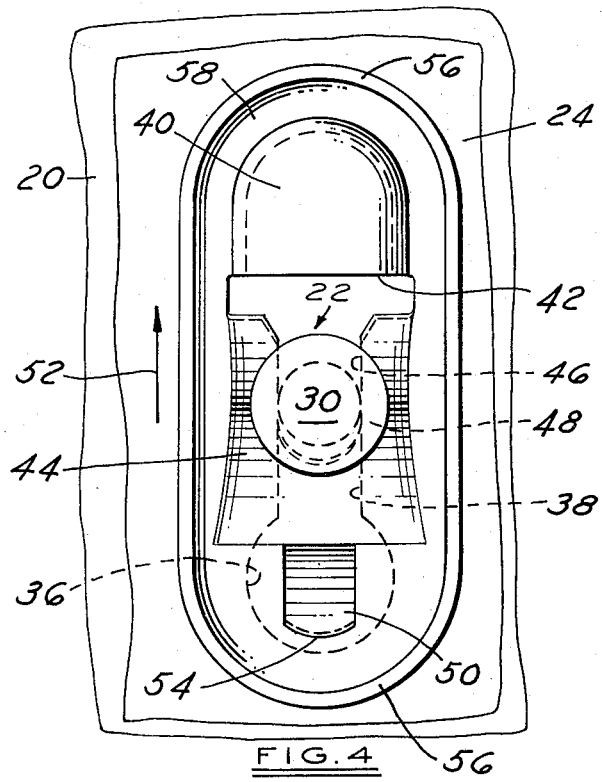
FIGURE 4 is a top view of the assembly shown in FIGURE 3.

The structural assembly shown in FIGURES 3 and 4 includes a support 20, a headed button or stud 22, a structural member 24, and a sheet metal clip 26. The stud of this embodiment has a shank portion 28 secured to the support, and an enlarged head portion 30 spaced from the plane of the support. The stud may be welded to the support surface, as shown at 32 of FIGURE 3 and described in United States Patent 3,153,468, or may be secured thereto by other suitable means including adhesive bonding.

Figure 1:
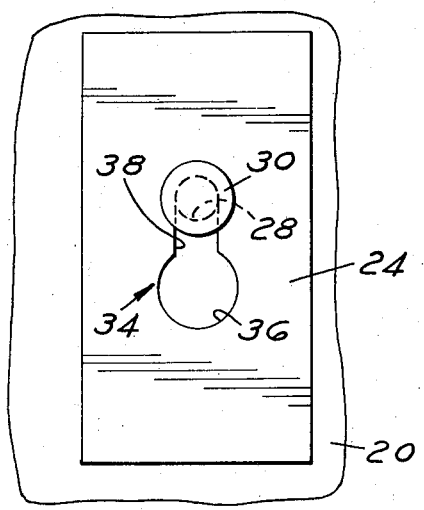
FIGURE 1 is a top view of the support, the structural member, and the stud of the structural assembly of my invention.

The structural member 24 is provided with a keyhole slot 34, as shown in FIGURE 1, including an enlarged opening 36 adapted to receive the enlarged head 30 of the button, and a slot 38 which receives the shank portion of the button. The slot terminates in a button seat which is received beneath the head portion of the button. The support may include a number of buttons, and the structural member would be provided with complementary positioned keyhole slots. The structural member is first supported on the buttons, as shown in FIGURE 1, and the clips are then secured in place. In a vertical truck panel or the like, the panel would be supported vertically on the buttons while the clips were being secured in place.

Figure 2:
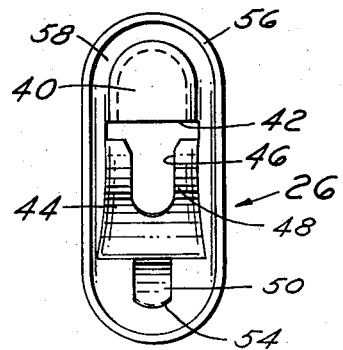
FIGURE 2 is a top view of one embodiment of the clip of my invention.

The embodiment of the clip shown in FIGURES 2 to 4 includes a downwardly opening cup-shaped portion 40 terminating in an enlarged opening 42. The stud is received beneath the cup-shaped portion, and the head portion of the stud may be received through the enlarged opening 42 by shifting the clip toward the ramp portion 44. The inclined ramp portion 44 has a slot 46 defined opposite the enlarged opening, and communicating therewith, and the clip may be shifted to seat the button on the button seat 48 defined at the end of the slot. The inclined ramp portion tensions the clip downwardly against the structural member 24, as shown in FIGURE 3, thereby securing the structural member in place.

In the preferred embodiment of the structural assembly of my invention, the clip is seated on the button such that the slot 46 of the clip is situated in opposed relation to the slot 38 of the structural member 24, as best shown in FIGURES 3 and 4, and the clip is provided with a downwardly extending detent 50 which is received in the enlarged opening 36 of the structural member. This relationship of the slots prevents further relative movement of the clip and structural member in the direction of securement of the clip, shown by arrow 52 in FIGURE 4, and the detent prevents withdrawal of the clip in the opposite direction. The narrow slots will of course prevent relative lateral movement of the assembly. The detent may be struck from the body portion of the clip, as shown in FIGURES 2 to 4, or other suitable detent means may be provided. In this embodiment of the clip of my invention, the detent extends at an acute angle to the body portion of the clip, away from the button seat, and the end 54 of the detent is rounded to conform to the circular opening 36 in the circular opening 36 in the structural member.

The peripheral edge 56 of this embodiment of the clip of my invention is turned upwardly to define a channel 58 at the edge of the clip. The upturned edge provides structural reinforcement for the clip, and prevents marring of the structural member during assembly and disassembly. Further, the channel 58 defined at the edge of the clip, and the opening 60 defined by the cup-shaped portion, may be filled with a sealant to prevent leakage through the assembly. A suitable sealant for this purpose is a close cell vinyl sponge, however other sealants may be equally satisfactory. The sealant may be expandable and molded in place.

FIGURES 5 and 6 illustrate another embodiment of the clip means of my invention; the structural assembly is indicated in phantom for reference to the description hereinabove. The clip 70 of this embodiment includes an elongated cover portion 72 having an end 74 reversely folded therebeneath to define a clip portion. The folded end of the clip terminates in an inclined ramp portion 76 having a slot 78 opening toward the leading end of the clip means 80. The button 22 of the structural assembly is received in the opening 82 defined in the leading end of the clip portion, beneath the cover portion, and the clip means is shifted to seat the button on the button seat 84 at the end of the slot, as shown in phantom. A detent 86 is provided opposite the entrance to the slot 78 to restrain the clip means against withdrawal, as described hereinabove, and the peripheral edge 88 of the clip means may be turned upwardly for structural reinforcement, and to prevent marring of the structural member during assembly. This embodiment of the clip may be sealed by providing a sealant in a space defined by the cover portion 72.

The primary advantages provided by this embodiment of the clip of my invention, over the embodiment disclosed in FIGURES 2 to 4, is the ease of sealing the assembly, and the relatively tamper proof cover which is especially important when the clip is exposed. The aesthetic value of an enclosed assembly may also be important in many applications. It will also be understood that the clip means may be modified and utilized independent at the structural assembly of this invention. For example, the cover portion may be extended longitudinaly to provide a trim piece for automotive applications. The embodiment of the clip shown in FIGURES 2 to 4 may however be preferred in certain applications because it is relatively simpler to produce, and utilizes less material.

Various materials may be used for all portions of the structural assembly, however the automotive and appliance industries utilize metal primarily for the support, which may be an automotive or truck body panel, the button, and the clip. Steel is used primarily for the support and structural member, with stainless steel being used for the button, as well as cold rolled zinc plated steel. The clip is preferably resilient, and may be formed from sheet metal such as SAE 1050 steel, having a hardness of C-44 to 47 Rockwell. The clips may be fabricated from sheet metal stock in a continuous die operation, and buttons may be welded to the support in accordance with the method described in the above-referenced patent.

While the structural assembly and clip have been described with reference to certain embodiments and arrangements of elements, it is understood by those skilled in the art that various modifications may be made to the embodiments disclosed herein. For example, various forms of detent means may be provided, and the structural member may be modified in form as well as material. The structural member may be resilient, or a resilient pad may be provided between the clip and a portion of the structural member.

What is claimed is:

1. A structural assembly, including a support having a headed stud secured thereto and extending from the surface thereof, a structural member overlying said support having an enlarged opening adapted to receive said stud and a slot communicating with said opening receiving said stud therethrough adjacent the end thereof, and a clip overlying said structural member having an opening adapted to receive said stud and a slot communicating with said opening overlying the slot of said structural member in opposed relation thereto receiving said stud adjacent the end thereof, and detent means on said clip opposite the entrance to said slot extending into the enlarged opening of said structural member to restrain withdrawal of said clip.

2. The structural assembly defined in claim 1, characterized in that the slot in said clip means is defined in an inclined ramp portion which tensions said clips means against said structural member.

3. A panel assembly, including a first panel, a button having a shank portion secured to first panel and an enlarged head portion spaced from the surface of said panel, a second panel overlying said first panel having a keyhole slot defining an enlarged opening adapted to receive the enlarged head of said button therethrough terminating in a button seat adjacent the end of the slot, and a clip means overlying said second panel having a slot adapted to receive the shank portion of said button terminating in a button seat overlying the button seat of said second panel in generally opposed relation thereto, and a detent means on said clip means opposite the entrance of said slot extending within the enlarged opening of said second panel restricting withdrawal of said clip.

4. The panel assembly defined in claim 3, characterized in that the slot in said clip means is defined in a resilient inclined ramp portion which tensions the clip beneath the head portion of said button against said second panel.

5. The panel assembly defined in claim 3, characterized in that said detent means is struck from said clip means to extend at an acute angle to the body portion of said clip means away from said enlarged opening.

6. A resilient sheet metal clip adapted to be secured to a support having a stud secured thereto, comprising: an elongated cover portion having an integral end portion reversely folded within said cover portion defining an integral ramp portion, said cover portion completely enclosing said ramp portion, said ramp portion having a stud receiving slot defined therein terminating in a stud seat and a locking means preventing withdrawal of the clip in the direction of receipt of the stud in said slot, said cover portion having a peripheral edge substantially enclosing said inclined ramp portion adapted to be tensioned against the supporting structure by said ramp portion.

7. The resilient sheet metal clip means defined in claim 6, characterized in that the peripheral edge of said cover portion is turned upwardly to define an upwardly facing channel extending about the periphery of said cover portion.

8. The resilient sheet metal clip means defined in claim 6, characterized in that said slot extends through the distal end of said ramp portion, and said leading end is turned upwardly to prevent marring of the supporting structure.

9. The resilient sheet metal clip means defined in claim 6, characterized in that said locking means includes a detent means opposite the entrance to said slot adapted to be received in an aperture in the supporting structure to prevent withdrawal of said clip.

10. The resilient sheet metal clip means defined in claim 9, characterized in that said detent means is integrally struck downwardly from said ramp portion at an acute angle thereto away from said stud seat.

11. The resilient sheet metal clip means defined in claim 6 in combination with a support having a stud secured thereto, and a structural member overlying said support having a keyhole slot defined therein terminating in a stud seat in opposed relation to the stud seat of said clip, said clip received on said stud in overlying relation to said structural member, and said locking means includes a detent means on said clip received within the enlarged opening of said keyhole slot restricting withdrawal of said clip from said stud.

12. A single piece resilient sheet metal clip adapted to secure a structural member to a support having a headed button secured thereto, comprising: a downwardly opening cup-shaped portion adapted to receive a button therebeneath having a side opening adapted to receive the enlarged head portion of the button therethrough, and an opposed integral inclined ramp portion opposite the side opening of said cup-shaped portion and adjacent thereto, said inclined ramp portion having a slot communicating with said side opening terminating in a button seat spaced from said cup-shaped portion, said clip means having an upturned peripheral edge defining an upwardly facing channel adjacent the peripheral edge of said clip.

13. The resilient sheet metal clip defined in claim 12, characterized in that said enlarged opening and said slot define a generally T-shaped opening, and said button is generally T-shaped when viewed perpendicular to the vertical axis of the button.

14. The resilient sheet metal clip defined in claim 12, characterized in that said clip means includes a downwardly facing detent means opposite said cup-shaped portion adapted to be received in an aperture in the supporting structure to prevent withdrawal of said clip.

15. The resilient sheet metal clip defined in claim 12 in combination with a support having a headed button secured thereto, and a structural member overlying said support having a keyhole slot defined therein terminating in a button seat in opposed relation to the button seat of said clip, said clip received on said structural member in overlying relation to said structural member, and a downwardly extending detent means on said clip received within the enlarged opening of said keyhole slot in said structural member restricting withdrawal of said clip.

References Cited

UNITED STATES PATENTS

| | | | |
|---|---|---|---|
| 2,621,357 | 12/1952 | Stuman | 287—189.35 X |
| 2,647,294 | 8/1953 | Davis | 85—8.9 X |
| 2,704,680 | 3/1955 | Bedford | 287—189.36 X |
| 3,178,987 | 4/1965 | Reese et al. | 287—53 X |
| 3,419,298 | 12/1968 | Worley | 287—189.36 |
| 1,972,283 | 9/1934 | Zimmers | 52—718 X |
| 2,082,668 | 6/1937 | Vanderveld | 52—717 |
| 2,172,302 | 9/1939 | Tinnerman | 24—237 |
| 2,358,837 | 9/1944 | Tinnerman | 85—36 |
| 2,709,390 | 5/1935 | Smith | 85—36 |
| 3,103,265 | 9/1963 | Meyer | 52—718 |
| 3,153,468 | 10/1964 | Sweeney | 52—718 |
| 3,216,166 | 11/1965 | Brown | 52—511 |
| 3,239,988 | 3/1966 | Meyer | 52—718 |

HENRY C. SUTHERLAND, Primary Examiner

S. D. BURKE, Assistant Examiner

U.S. Cl. X.R.

85—8.6